US007532194B2

(12) United States Patent
Chui

(10) Patent No.: US 7,532,194 B2
(45) Date of Patent: May 12, 2009

(54) DRIVER VOLTAGE ADJUSTER

(75) Inventor: Clarence Chui, San Mateo, CA (US)

(73) Assignee: IDC, LLC, San Francisco, CA (US)

( * ) Notice: Subject to any disclaimer, the term of this patent is extended or adjusted under 35 U.S.C. 154(b) by 954 days.

(21) Appl. No.: 10/772,120

(22) Filed: Feb. 3, 2004

(65) Prior Publication Data

US 2005/0168431 A1 Aug. 4, 2005

(51) Int. Cl.
*G09G 3/34* (2006.01)
*G06F 3/038* (2006.01)

(52) U.S. Cl. ........................ 345/108; 345/204; 345/211

(58) Field of Classification Search ........... 345/55–109, 345/204–214
See application file for complete search history.

(56) References Cited

U.S. PATENT DOCUMENTS

| | | | |
|---|---|---|---|
| 2,534,846 | A | 12/1950 | Ambrose et al. |
| 3,439,973 | A | 4/1969 | Paul et al. |
| 3,443,854 | A | 5/1969 | Weiss |
| 3,653,741 | A | 4/1972 | Marks |
| 3,656,836 | A | 4/1972 | de Cremoux et al. |
| 3,725,868 | A | 4/1973 | Malmer, Jr. et al. |
| 3,813,265 | A | 5/1974 | Marks |
| 3,955,880 | A | 5/1976 | Lierke |
| 4,099,854 | A | 7/1978 | Decker et al. |
| 4,196,396 | A | 4/1980 | Smith |
| 4,228,437 | A | 10/1980 | Shelton |
| 4,377,324 | A | 3/1983 | Durand et al. |
| 4,389,096 | A | 6/1983 | Hori et al. |
| 4,403,248 | A | 9/1983 | te Velde |
| 4,441,791 | A | 4/1984 | Hornbeck |
| 4,445,050 | A | 4/1984 | Marks |
| 4,459,182 | A | 7/1984 | te Velde |
| 4,482,213 | A | 11/1984 | Piliavin et al. |
| 4,500,171 | A | 2/1985 | Penz et al. |
| 4,519,676 | A | 5/1985 | te Velde |
| 4,531,126 | A | 7/1985 | Sadones |
| 4,566,935 | A | 1/1986 | Hornbeck |
| 4,571,603 | A | 2/1986 | Hornbeck et al. |
| 4,596,992 | A | 6/1986 | Hornbeck |
| 4,615,595 | A | 10/1986 | Hornbeck |

(Continued)

FOREIGN PATENT DOCUMENTS

| | | |
|---|---|---|
| EP | 0173808 A1 | 3/1986 |

(Continued)

OTHER PUBLICATIONS

Miles, MEMS-based interferometric modulator for display applications, Part of the SPIE Conference on Micromachined Devices and Components, vol. 3876, pp. 20-28 (1999).

(Continued)

*Primary Examiner*—David L Lewis
(74) *Attorney, Agent, or Firm*—Knobbe Martens Olson & Bear LLP

(57) ABSTRACT

A display system uses a standardized display driver to provide row and column address voltages. The row and address column voltages are used by an array of interferometric elements through a voltage adjuster to adjust the row address voltages to provide adjusted row address voltages to the array of interferometric elements.

20 Claims, 3 Drawing Sheets

U.S. PATENT DOCUMENTS 4,662,746 A 5/1987 Hornbeck
4,663,083 A 5/1987 Marks
4,681,403 A 7/1987 te Velde et al.
4,710,732 A 12/1987 Hornbeck
4,748,366 A 5/1988 Taylor
4,786,128 A 11/1988 Birnbach
4,790,635 A 12/1988 Apsley
4,856,863 A 8/1989 Sampsell et al.
4,900,395 A 2/1990 Syverson et al.
4,937,496 A 6/1990 Neiger et al.
4,954,789 A 9/1990 Sampsell
4,956,619 A 9/1990 Hornbeck
4,982,184 A 1/1991 Kirkwood
5,018,256 A 5/1991 Hornbeck
5,022,745 A 6/1991 Zayhowski et al.
5,028,939 A 7/1991 Hornbeck et al.
5,037,173 A 8/1991 Sampsell et al.
5,044,736 A 9/1991 Jaskie et al.
5,055,833 A 10/1991 Hehlen et al.
5,061,049 A 10/1991 Hornbeck
5,075,796 A 12/1991 Schildkraut et al.
5,078,479 A 1/1992 Vuilleumier
5,079,544 A 1/1992 DeMond et al.
5,083,857 A 1/1992 Hornbeck
5,096,279 A 3/1992 Hornbeck et al.
5,099,353 A 3/1992 Hornbeck
5,124,834 A 6/1992 Cusano et al.
5,136,669 A 8/1992 Gerdt
5,142,405 A 8/1992 Hornbeck
5,142,414 A 8/1992 Koehler
5,153,771 A 10/1992 Link et al.
5,162,787 A 11/1992 Thompson et al.
5,168,406 A 12/1992 Nelson
5,170,156 A 12/1992 DeMond et al.
5,172,262 A 12/1992 Hornbeck
5,179,274 A 1/1993 Sampsell
5,192,395 A 3/1993 Boysel et al.
5,192,946 A 3/1993 Thompson et al.
5,206,629 A 4/1993 DeMond et al.
5,212,582 A 5/1993 Nelson
5,214,419 A 5/1993 DeMond et al.
5,214,420 A 5/1993 Thompson et al.
5,216,537 A 6/1993 Hornbeck
5,226,099 A 7/1993 Mignardi et al.
5,227,900 A 7/1993 Inaba et al.
5,228,013 A 7/1993 Bik
5,231,532 A 7/1993 Magel et al.
5,233,385 A 8/1993 Sampsell
5,233,456 A 8/1993 Nelson
5,233,459 A 8/1993 Bozler et al.
5,254,980 A 10/1993 Hendrix et al.
5,272,473 A 12/1993 Thompson et al.
5,278,652 A 1/1994 Urbanus et al.
5,280,277 A 1/1994 Hornbeck
5,287,096 A 2/1994 Thompson et al.
5,293,272 A 3/1994 Jannson et al.
5,296,950 A 3/1994 Lin et al.
5,305,640 A 4/1994 Boysel et al.
5,311,360 A 5/1994 Bloom et al.
5,312,513 A 5/1994 Florence et al.
5,323,002 A 6/1994 Sampsell et al.
5,324,683 A 6/1994 Fitch et al.
5,325,116 A 6/1994 Sampsell
5,326,430 A 7/1994 Cronin et al.
5,327,286 A 7/1994 Sampsell et al.
5,331,454 A 7/1994 Hornbeck
5,339,116 A 8/1994 Urbanus et al.
5,345,328 A 9/1994 Fritz et al.
5,358,601 A 10/1994 Cathey
5,365,283 A 11/1994 Doherty et al.
5,381,232 A 1/1995 van Wijk
5,381,253 A 1/1995 Sharp et al.
5,401,983 A 3/1995 Jokerst et al.
5,411,769 A 5/1995 Hornbeck
5,444,566 A 8/1995 Gale et al.
5,446,479 A 8/1995 Thompson et al.
5,448,314 A 9/1995 Heimbuch et al.
5,452,024 A 9/1995 Sampsell
5,454,906 A 10/1995 Baker et al.
5,457,493 A 10/1995 Leddy et al.
5,457,566 A 10/1995 Sampsell et al.
5,459,602 A 10/1995 Sampsell
5,459,610 A 10/1995 Bloom et al.
5,461,411 A 10/1995 Florence et al.
5,481,274 A 1/1996 Aratani et al.
5,489,952 A 2/1996 Gove et al.
5,497,172 A 3/1996 Doherty et al.
5,497,197 A 3/1996 Gove et al.
5,499,062 A 3/1996 Urbanus
5,500,635 A 3/1996 Mott
5,500,761 A 3/1996 Goossen et al.
5,506,597 A 4/1996 Thompson et al.
5,515,076 A 5/1996 Thompson et al.
5,517,347 A 5/1996 Sampsell
5,523,803 A 6/1996 Urbanus et al.
5,526,051 A 6/1996 Gove et al.
5,526,172 A 6/1996 Kanack
5,526,327 A 6/1996 Cordova, Jr.
5,526,688 A 6/1996 Boysel et al.
5,535,047 A 7/1996 Hornbeck
5,548,301 A 8/1996 Kornher et al.
5,551,293 A 9/1996 Boysel et al.
5,552,924 A 9/1996 Tregilgas
5,552,925 A 9/1996 Worley
5,563,398 A 10/1996 Sampsell
5,567,334 A 10/1996 Baker et al.
5,570,135 A 10/1996 Gove et al.
5,579,149 A 11/1996 Moret et al.
5,581,272 A * 12/1996 Conner et al. ............... 345/108
5,583,688 A 12/1996 Hornbeck
5,589,852 A 12/1996 Thompson et al.
5,597,736 A 1/1997 Sampsell
5,600,383 A 2/1997 Hornbeck
5,602,671 A 2/1997 Hornbeck
5,606,441 A 2/1997 Florence et al.
5,608,468 A 3/1997 Gove et al.
5,610,438 A 3/1997 Wallace et al.
5,610,624 A 3/1997 Bhuva
5,610,625 A 3/1997 Sampsell
5,619,059 A 4/1997 Li et al.
5,619,365 A 4/1997 Rhoades et al.
5,619,366 A 4/1997 Rhoads et al.
5,629,790 A 5/1997 Neukermans et al.
5,633,652 A 5/1997 Kanbe et al.
5,636,052 A 6/1997 Arney et al.
5,636,185 A 6/1997 Brewer et al.
5,638,084 A 6/1997 Kalt
5,638,946 A 6/1997 Zavracky
5,641,391 A 6/1997 Hunter et al.
5,646,768 A 7/1997 Kaeiyama
5,650,834 A 7/1997 Nakagawa et al.
5,650,881 A 7/1997 Hornbeck
5,654,741 A 8/1997 Sampsell et al.
5,657,099 A 8/1997 Doherty et al.
5,659,374 A 8/1997 Gale, Jr. et al.
5,665,997 A 9/1997 Weaver et al.
5,673,139 A 9/1997 Johnson
5,683,591 A 11/1997 Offenberg
5,703,710 A 12/1997 Brinkman et al.
5,710,656 A 1/1998 Goosen
5,726,480 A 3/1998 Pister
5,739,945 A 4/1998 Tayebati
5,745,193 A 4/1998 Urbanus et al.
5,745,281 A 4/1998 Yi et al.

5,771,116 A 6/1998 Miller et al.
5,784,189 A 7/1998 Bozler et al.
5,784,190 A 7/1998 Worley
5,784,212 A 7/1998 Hornbeck
5,793,504 A 8/1998 Stoll
5,808,780 A 9/1998 McDonald
5,818,095 A 10/1998 Sampsell
5,825,528 A 10/1998 Goosen
5,835,255 A 11/1998 Miles
5,842,088 A 11/1998 Thompson
5,912,758 A 6/1999 Knipe et al.
5,943,158 A 8/1999 Ford et al.
5,959,763 A 9/1999 Bozler et al.
5,986,796 A 11/1999 Miles
6,028,690 A 2/2000 Carter et al.
6,038,056 A 3/2000 Florence et al.
6,040,937 A 3/2000 Miles
6,049,317 A 4/2000 Thompson et al.
6,055,090 A 4/2000 Miles
6,057,903 A 5/2000 Colgan et al.
6,061,075 A 5/2000 Nelson et al.
6,099,132 A 8/2000 Kaeriyama
6,100,872 A 8/2000 Aratani et al.
6,113,239 A 9/2000 Sampsell et al.
6,147,790 A 11/2000 Meier et al.
6,160,833 A 12/2000 Floyd et al.
6,180,428 B1 1/2001 Peeters et al.
6,201,633 B1 3/2001 Peeters et al.
6,232,936 B1 5/2001 Gove et al.
6,243,149 B1 6/2001 Swanson et al.
6,246,398 B1 6/2001 Koo
6,282,010 B1 8/2001 Sulzbach et al.
6,295,154 B1 9/2001 Laor et al.
6,323,982 B1 11/2001 Hornbeck
6,433,917 B1 8/2002 Mei et al.
6,447,126 B1 9/2002 Hornbeck
6,465,355 B1 10/2002 Horsley
6,466,358 B2 10/2002 Tew
6,466,486 B2 10/2002 Kawasumi
6,473,274 B1 10/2002 Maimone et al.
6,480,177 B2 11/2002 Doherty et al.
6,496,122 B2 12/2002 Sampsell
6,545,335 B1 4/2003 Chua et al.
6,548,908 B2 4/2003 Chua et al.
6,549,338 B1 4/2003 Wolverton et al.
6,552,840 B2 4/2003 Knipe
6,574,033 B1 6/2003 Chui et al.
6,589,625 B1 7/2003 Kothari et al.
6,600,201 B2 7/2003 Hartwell et al.
6,606,175 B1 8/2003 Sampsell et al.
6,625,047 B2 9/2003 Coleman, Jr.
6,630,786 B2 10/2003 Cummings et al.
6,632,698 B2 10/2003 Ives
6,643,069 B2 11/2003 Dewald
6,650,455 B2 11/2003 Miles
6,666,561 B1 12/2003 Blakley
6,674,090 B1 1/2004 Chua et al.
6,674,562 B1 1/2004 Miles
6,680,792 B2 1/2004 Miles
6,710,908 B2 3/2004 Miles et al.
6,741,377 B2 5/2004 Miles
6,741,384 B1 5/2004 Martin et al.
6,741,503 B1 5/2004 Farris et al.
6,747,785 B2 6/2004 Chen et al.
6,750,876 B1 6/2004 Atsatt et al.
6,775,174 B2 8/2004 Huffman et al.
6,778,155 B2 8/2004 Doherty et al.
6,781,643 B1 8/2004 Watanabe et al.
6,794,119 B2 9/2004 Miles
6,811,267 B1 11/2004 Allen et al.
6,813,060 B1 11/2004 Garcia et al.
6,819,469 B1 11/2004 Koba
6,822,628 B2 11/2004 Dunphy et al.
6,829,132 B2 12/2004 Martin et al.
6,853,129 B1 2/2005 Cummings et al.
6,855,610 B2 2/2005 Tung et al.
6,859,218 B1 2/2005 Luman et al.
6,861,277 B1 3/2005 Monroe et al.
6,862,022 B2 3/2005 Slupe
6,862,029 B1 3/2005 D'Souza et al.
6,867,896 B2 3/2005 Miles
6,870,581 B2 3/2005 Li et al.
6,903,860 B2 6/2005 Ishii
6,933,676 B2 * 8/2005 Raunig ........................ 315/46
7,123,216 B1 10/2006 Miles
7,161,728 B2 1/2007 Sampsell et al.
7,196,837 B2 * 3/2007 Sampsell et al. .............. 345/85
7,245,285 B2 * 7/2007 Yeh et al. .................... 345/108
7,274,347 B2 * 9/2007 Richards ..................... 345/204
2001/0003487 A1 6/2001 Miles
2001/0034075 A1 10/2001 Onoya
2002/0000959 A1 1/2002 Colgan et al.
2002/0015215 A1 2/2002 Miles
2002/0075555 A1 6/2002 Miles
2002/0126364 A1 9/2002 Miles
2003/0043157 A1 3/2003 Miles
2003/0072070 A1 4/2003 Miles
2003/0202264 A1 10/2003 Weber et al.
2003/0202265 A1 10/2003 Reboa et al.
2003/0202266 A1 10/2003 Ring et al.
2004/0026757 A1 2/2004 Crane et al.
2004/0051929 A1 3/2004 Sampsell et al.
2004/0058532 A1 3/2004 Miles et al.
2004/0080807 A1 4/2004 Chen et al.
2004/0145049 A1 7/2004 McKinnell et al.
2004/0147056 A1 7/2004 McKinnell et al.
2004/0160143 A1 8/2004 Shreeve et al.
2004/0174583 A1 9/2004 Chen et al.
2004/0179281 A1 9/2004 Reboa
2004/0212026 A1 10/2004 Van Brocklin et al.
2004/0217378 A1 11/2004 Martin et al.
2004/0217919 A1 11/2004 Pichl et al.
2004/0218251 A1 11/2004 Piehl et al.
2004/0218334 A1 11/2004 Martin et al.
2004/0218341 A1 11/2004 Martin et al.
2004/0227493 A1 11/2004 Van Brocklin et al.
2004/0240032 A1 12/2004 Miles
2004/0240138 A1 12/2004 Martin et al.
2004/0245588 A1 12/2004 Nikkel et al.
2004/0263944 A1 12/2004 Miles et al.
2005/0001828 A1 1/2005 Martin et al.
2005/0038950 A1 2/2005 Adelmann
2005/0057442 A1 3/2005 Way
2005/0068583 A1 3/2005 Gutkowski et al.
2005/0069209 A1 3/2005 Damera-Venkata et al.
2005/0286114 A1 12/2005 Miles
2006/0256059 A1 * 11/2006 Stumbo et al. ................ 345/92
2006/0262126 A1 * 11/2006 Miles ......................... 345/540

FOREIGN PATENT DOCUMENTS

EP 0295802 A 12/1988
EP 0 667 548 A1 8/1995
EP 1258860 A1 11/2002
EP 1345197 A 9/2003
EP 1381023 A 1/2004
JP 05275401 A1 10/1993
JP 2002 175053 6/2002
JP 2004-29571 1/2004
WO WO 95/30924 11/1995
WO WO 97/17628 5/1997
WO WO 99/52006 A2 10/1999
WO WO 99/52006 A3 10/1999
WO WO 03/007049 A1 1/2003
WO WO 03/069413 A1 8/2003
WO WO 03/073151 A1 9/2003

| | | | |
|---|---|---|---|
| WO | WO 2004/006003 | A1 | 1/2004 |
| WO | WO 2004/026757 | A2 | 4/2004 |

OTHER PUBLICATIONS

Miles et al., 5.3: Digital Paper™: Reflective displays using interferometric modulation, SID Digest, vol. XXXI, 2000 pp. 32-35.
IPRP for PCT/US095/002359 filed Jan. 26, 2005.
Fan et al., "Channel Drops Filters in Photonic Crystals," Optics Express, vol. 3, No. 1 (1998).
Giles et al., "A Silicon MEMS Optical Switch Attenuator and Its e in Lightwave Subsystems," IEEE Journal of Selected Topics in Quanum Electronics, vol. 5, No. 1, pp. 18-25, (Jan./Feb. 1999).
Ibbotson et al., "Comparison of XeF2 and F-atom reactions with Si and SiO2," Applied Physics Letters, vol. 44, No. 12, pp. 1129-1131 (Jun. 1984).
Joannopoulos et al., "Photonic Crystals: Molding the Flow of Light," Princeton University Press (1995).
Kim et al., "Control of Optical Transmission Through Metals Perforated With Subwavelength Hole Arrays," Optic Letters, vol. 24, No. 4, pp. 256-257, (Feb. 1999).
Lin et al., "Free-Space Micromachined Optical Switches for Optical Networking," IEEE Journal of Selected Topics in Quantum Electronics, vol. 5, No. 1, pp. 4-9. (Jan./Feb. 1999).
Little et al., "Vertically Coupled Microring Resonator Channel Dropping Filter," IEEE Photonics Technology Letters, vol. 11, No. 2, (1999).
Magel, "Integrated Optic Devices ing Micromachined Metal Membranes," SPIE vol. 2686, 0-8194-2060-Mar. 1996.
Nagami et al., "Plastic Cell Architecture: Towards Reconfigurable Computing For General-Purpose," IEEE, 0-8186-8900-, pp. 68-77, (May 1998).
Schnakenberg, et al. TMAHW Etchants for Silicon Micromachining. 1991 International Conference on Solid State Sensors and Actuators-Digest of Technical Papers. pp. 815-818.
Science and Technology, The Economist, pp. 89-90, (May 1999).
Williams, et al. Etch Rates for Micromachining Processing. Journal of Microelectromechanical Systems, vol. 5, No. 4, pp. 256-259, (Dec. 1996).
Winters, et al. The etching of silicon with XeF2 vapor. Applied Physics Letters, vol. 34, No. 1, pp. 70-73, (Jan. 1979).
Zhou et al., "Waveguide Panel Display ing Electromechanical Spatial Modulators" SID Digest, vol. XXIX, (1998).
Akasaka, "Three-Dimensional IC Trends," Proceedings of IEEE, vol. 74, No. 12, pp. 1703-1714 (Dec. 1986).
Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).
Aratani et al., "Surface micromachined tuneable interferometer array," Sensors and Actuators, pp. 17-23 (1994).
Conner, "Hybrid Color Display Using Optical Interference Filter Array," SID Digest, pp. 577-580 (1993).
Goossen et al., "Possible Display Applications of the Silicon Mechanical Anti-Reflection Switch," Society for Information Display (1994).
Goossen et al., "Silicon Modulator Based on Mechanically-Active Anti-Reflection Layer with 1Mbit/sec Capability for Fiber-in-the-Loop Applications," IEEE Photonics Technology Letters, pp. 1119-1121 (Sep. 1994).
Gosch, "West Germany Grabs the Lead in X-Ray Lithography," Electronics, pp. 78-80 (Feb. 5, 1987).
Howard et al., "Nanometer-Scale Fabrication Techniques," VLSI Electronics: Microstructure Science, vol. 5, pp. 145-153, and pp. 166-173 (1982).
Jackson, "Classical Electrodynamics," John Wiley & Sons Inc., pp. 568-573, date unknown.
Jerman et al., "A Miniature Fabry-Perot Interferometer Fabricated Using Silicon Micromaching Techniques," IEEE Electron Devices Society (1998).
Johnson, "Optical Scanners," Microwave Scanning Antennas, vol. 1, pp. 251-261 (1964).
"Light over Matter," Circle No. 36 (Jun. 1993).
Miles, "A New Reflective FPD Technology Using Interferometric Modulation," The Proceedings of the Society for Information Display (May 11-16, 1997).
Newsbreaks, "Quantum-trench devices might operate at terahertz frequencies," Laser Focus World (May 1993).
Oliner, "Radiating Elements and Mutual Coupling," Microwave Scanning Antennas, vol. 2, 131-157 and pp. 190-194 (1966).
Raley et al., "A Fabry-Perot Microinterferometer for Visible Wavelengths," IEEE Solid-State Sensor and Actuator Workshop, Hilton Head, SC, pp. 170-173 (1992).
Sperger et al., "High Performance Patterned All-Dielectric Interference Colour Filter for Display Applications," SID Digest, pp. 81-83 (1994).
Stone, "Radiation and Optics, An Introduction to the Classical Theory," McGraw-Hill, pp. 340-343 (1963).
Walker et al., "Electron-beam-tunable Interference Filter Spatial Light Modulator," Optics Letters vol. 13, No. 5, pp. 345-347 (May 1988).
Winton, "A novel way to capture solar energy," Chemical Week, pp. 17-18 (May 15, 1985).
Wu et al., "Design of a Reflective Color LCD Using Optical Interference Reflectors," Asia Display '95, pp. 929-931 (Oct. 16, 1995).
Miles, et al., "10.1: Digital Paper for Reflective Displays," 2002 SID International Symposium Digest of Technical Papers, Boston, MA, SID International Symposium Digest of Technical Papers, San Jose, CA, vol. 33/1, pp. 115-117 (May 21-23, 2002).
Miles, "Interferometric Modulation: MOEMS as an Enabling Technology for High-Performance Reflective Displays," Proceedings of the International Society for Optical Engineering, San Jose, CA, vol. 49085, pp. 131-139 (Jan. 28, 2003).
PCT/US2005/002359—Invitation to Pay Additional Fees/Partial International Search (May 23, 2005).
PCT Written Opinion of the International Searching Authority dated Aug. 5, 2005 (9 pp).
PCT International Search Report dated Aug. 5, 2005 (6 pp).

* cited by examiner

Figure 1
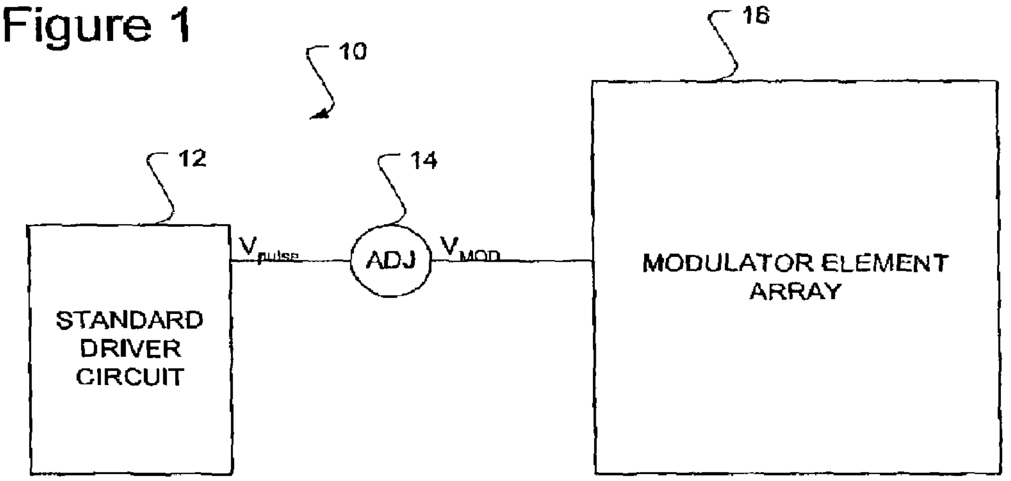
Figure 2
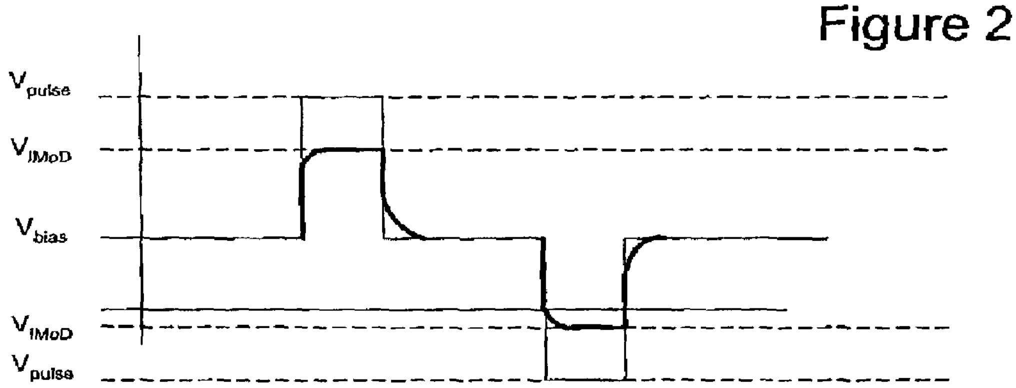
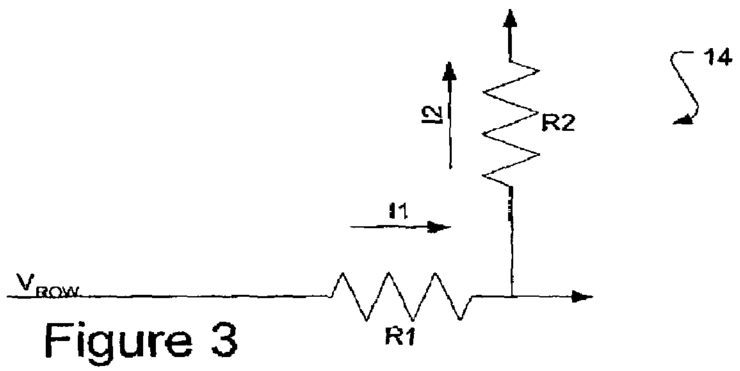
Figure 3

DRIVER VOLTAGE ADJUSTER

BACKGROUND

Spatial light modulators provide an alternative technology to cathode ray tube (CRT) displays. A spatial light modulator array is an array of individually addressable elements, typically arranged in rows and columns. One or more individually addressable elements will correspond to a picture element of the displayed image.

The most prevalent spatial light modulator technology is liquid crystal displays (LCD), especially for mobile devices. In an LCD display, rows and columns of electrodes are used to orient a liquid crystalline material. The orientation of the liquid crystalline material may block or transmit varying levels of light, and is controlled by the voltages on the electrodes. These voltages are supplied to the array of elements according to the image data. A driver circuit, sometimes referred to as driver chip, performs the conversion from image data to the row and column addressing lines of the array. Given the prevalence of liquid crystal display technology, driver chips for LCD displays are widely available and marketed tested.

Unfortunately, the voltages used by many LCD driver chips have relatively fixed waveforms that limit their applicability to other types of spatial light modulator display technology that also require conversion of image data to row and column addressing line signals. In addition, it limits the availability of these widely-available driver circuits to other types of display technology.

BRIEF DESCRIPTION OF THE DRAWINGS

The embodiments of this invention may be best understood by reading the disclosure with reference to the drawings, wherein:

FIG. 1 shows an embodiment of a display system having a display driver, a voltage adjuster and an array of modulator display elements.

FIG. 2 shows a diagram of row addressing and bias signals for an interferometric modulator and a driver circuit.

FIG. 3 shows a block diagram of an embodiment of a voltage adjuster.

DETAILED DESCRIPTION OF THE EMBODIMENTS

Figure 4:
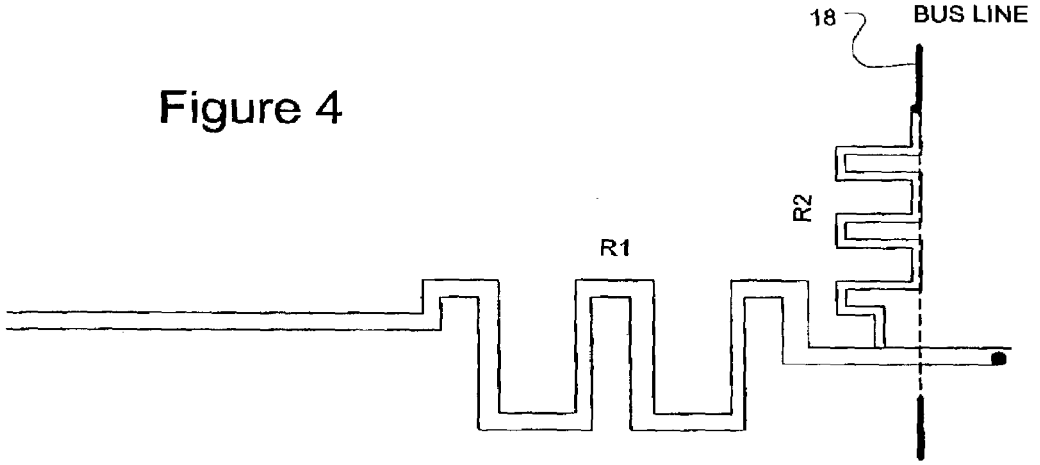
FIG. 4 shows an implementation of an embodiment of a voltage adjuster as it may be manufactured.

FIG. 1 shows an embodiment of a display system 10. The standard driver circuit 12 may be one of any already commercially available flat panel display driver. As mentioned above, the most prevalent of these driver chips are those used for LCD displays. The individual display elements of an LCD array are generally defined by intersections of rows of electrodes with columns of electrodes. One method of addressing these types of arrays is known as passive array addressing.

In passive array addressing, a voltage pulse is applied a voltage pulse along one row of the electrodes while applying pulses to all of the columns. The amplitude of the column pulses corresponds to the specific data desired along the row being selected. The voltages and timing of the various pulses is such that the row being selected is the row primarily affected by the data pulses being applied to the columns.

After having written the data to the selected row, the row pulse is reduced and the next row is selected for data writing via the application of a row pulse and set of column pulses corresponding to the desired data on that row. The process is repeated in a row-by-row fashion until all of the rows have been pulsed. After pulsing every row, the sequence returns to the first row again and the process is repeated. This basic method is often used for passive matrix LCD displays. The specific waveforms used for passive matrix LCDs have evolved over a number of years of development and have reached a relatively mature state. Generally, it is the difference in voltage between a row and a column, and the associated voltage swing, which enables the device addressing. An example of such a row addressing waveform is shown in FIG. 2. As will be discussed later, embodiments of the invention may be applied to column addressing as well.

In FIG. 2, the rows of the device array that are not to be addressed are held at a row bias voltage, $V_{bias}$. The first pulse, the one that reaches the full $V_{pulse}$ amplitude, is that which is provided by the driver. As can be seen, the amplitude voltage swing from bias to the positive pulse has relatively large amplitude. In contrast, the positive and negative voltage pulses desired are shown by the darker lines that reach an amplitude of $V_{iMoD}$.

An iMoD is an example of a newer type of modulator. The iMoD employs a cavity having at least one movable or deflectable wall. As the wall, typically comprised at least partly of metal, moves towards a front surface of the cavity, interference occurs that affects the color of light viewed at the front surface. The front surface is typically the surface where the image seen by the viewer appears, as the iMoD is a direct-view device.

In a monochrome display, such as a display that switches between black and white, one iMoD element might correspond to one pixel. In a color display, three iMoD elements may make up each pixel, one each for red, green and blue.

The individual iMoD elements are controlled separately to produce the desired pixel reflectivity. Typically, a voltage is applied to the movable wall of the cavity, causing it be to electrostatically attracted to the front surface that in turn affects the color of the pixel seen by the viewer. In the display system 10 of FIG. 1, a standardized driver, such as an LCD driver 12 is used with an array of interferometric modulator arrays 16 via an adjuster circuit 14. The adjuster circuit 14 adjusts the row address voltage $V_{pulse}$ from the driver circuit 12 to an adjusted row address voltage $V_{iMoD}$.

An embodiment of the adjuster circuit 14 is shown in FIG. 3. The adjuster circuit essential comprises a set of resistors R1 and R2, set up in a resistor divider network. The ratio of R2/R1 scales the output voltage as needed, according to the formula:

$$V_{iMoD} = \frac{R2}{R1 + R2} V_{pulse}.$$

Generally, a desirable scaling would be setting up resistors with a ratio 1:1 or 1:3. In the example of the iMoD, $V_{MOD}$ would be $V_{iMoD}$. LCD drivers typically have an output range of 15-30 volts, with the desired output voltage $V_{MOD}$ in the range of 5-15 volts. The result of applying a shunt resistor network is to reduce the amplitude of the row pulse provided by the driver, $V_{pulse}$ to a more acceptable level, such as $V_{iMoD}$.

One possible embodiment of the resistor network could be manufactured directly on the same substrate as the modulator array. On example of an exploded view of integrated metal resistors is shown in FIG. 4. R1 and R2 would be manufactured out of the metal layers used in manufacturing the modulator elements. A conductive bus line 18 connects the shunt resistors R1, insulated from the input lines, preventing shorts between the shunt resistor outputs and the inputs to the modulator array. Other alternatives are of course possible. Depending upon the driver chip selected, a different level of resistance could be fabricated.

Figure 5:
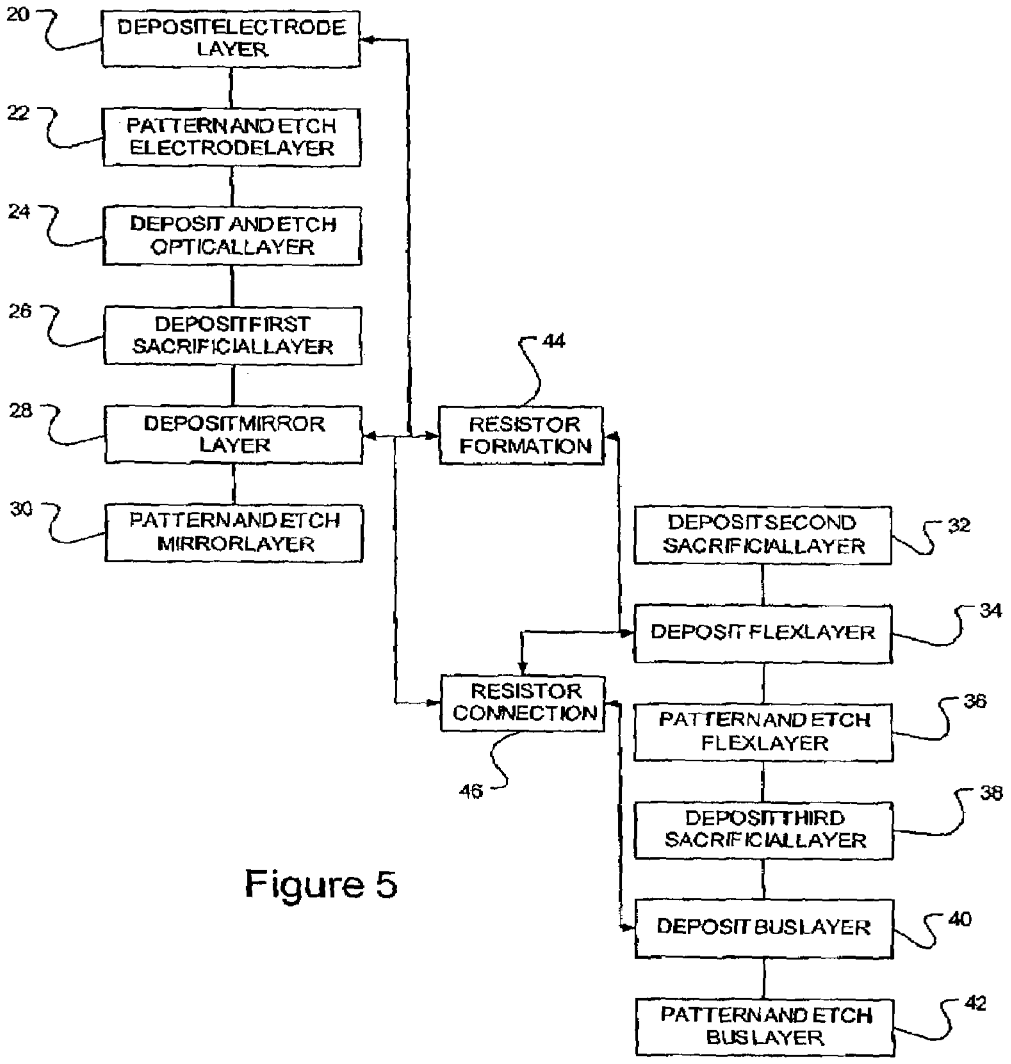
FIG. 5 shows an embodiment of a simultaneous manufacturing process for a spatial light modulator and a voltage adjuster.

An embodiment of manufacturing an adjuster circuit simultaneously with a modulator array is shown in FIG. 5. The term simultaneously as used here means that the adjuster circuit and the modulator array are both completed at the end of this process. This particular method of manufacture is for an interferometric modulator, but the implementation of the invention could occur with any modulator array that has some available area on the substrate upon which the modulator is manufactured. At 20, a first metal layer is deposited. This metal layer is then patterned and etched at 22 to form an electrode layer. An optical layer is then deposited and etched to form the active optical area of the modulator array at 24. Any area outside the active optical area could be utilized for the resistor network.

In the specific case of the iMoD, a first sacrificial layer is deposited at 26, and then a second metal layer is deposited at 28. The mirror layer is then patterned and etched at 30. In a first embodiment of this process, the patterning and etching process will also form the supports needed to suspend the mirror elements over a cavity formed when the sacrificial layer is removed. In this embodiment, the resistor is formed from the first metal layer and then connections are formed using the second metal layer. The connections cannot be formed from the same layer without an extra pattern and etch process to avoid forming a short circuit between the shunt resistor and the modulator address lines.

In an alternative embodiment, a flex layer provides a separate layer to support the mirror over the cavity. In this embodiment, a second sacrificial layer is deposited at 32. A third metal layer is deposited on the second sacrificial layer at 34. The flex layer is patterned and etched at 36 to form the supports and posts. In this embodiment the resistor network can be formed in the first or second metal layer, and the connections formed using the second or third metal layer. The resistors are formed in one metal layer and the connections made with a subsequent metal layer.

In yet another embodiment, a bus layer could be formed above the modulator elements. In this embodiment, a third sacrificial layer 38 is deposited and then a bus layer 40 deposited upon the third sacrificial layer. The bus layer is then patterned at etched at 42. Again, the resistors could be formed at 44, which may occur in one metal layer and connection provided at 46, in a subsequent metal layer. In the case of the bus layer embodiment, the resistors could be formed in the first, second or third metal layers, with the connections made using the second, third or fourth metal layers, so long as the connection layer is subsequent to the formation layer.

Figure 6:
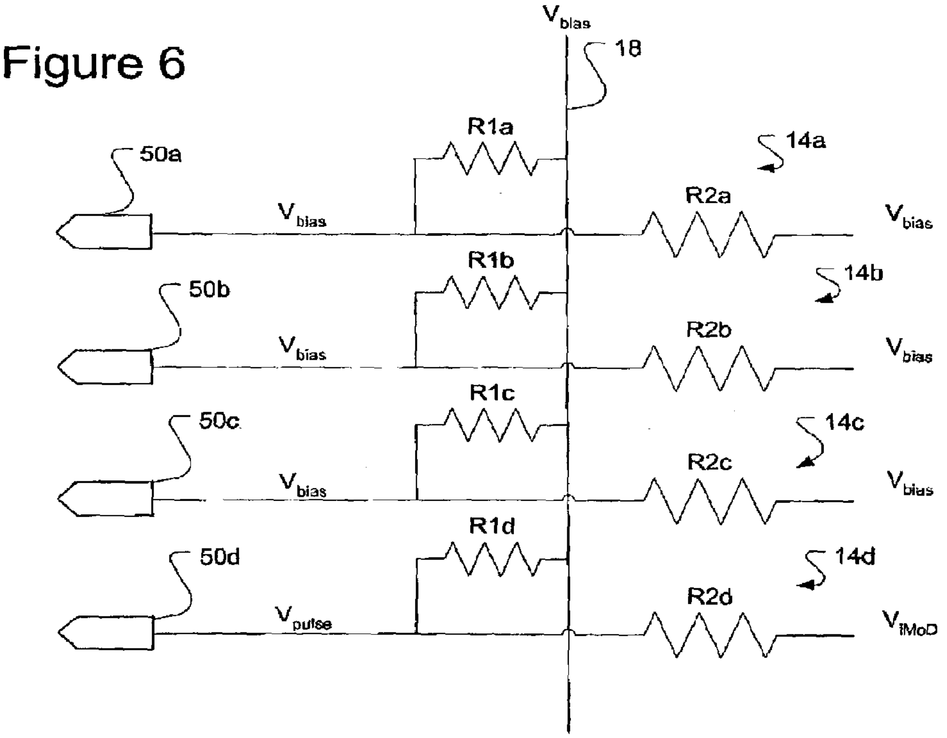
FIG. 6 shows an embodiment of an adjuster network.

Having seen the individual resistor network, it is helpful to see a portion of an array with multiple lines as shown in FIG. 6. The resistor networks 14*a-d* are connected to the outputs from the driver chips 50*a-d*. The shunt resistors R2*a-d* are connected to the conductive bus line 18, with the output resistors R1*a-d* are connected to the modulator row lines, not shown, to provide the adjusted row voltage to the modulator elements. In this example, line 50*d* is active and the $V_{pulse}$ is converted to $V_{iMoD}$. In this manner, a standardized driver circuit such as an LCD driver chip can be used to drive other types of modulators through an adjuster circuit. The adjuster circuit provides stable, controlled output address voltage. As mentioned previously, it is also possible to apply this same modification to the column address pulses. The voltages and resistor values may vary, but a shunt resistor network applied to column addressing signals is within the scope of this invention.

Thus, although there has been described to this point a particular embodiment for a method and apparatus for a driver voltage adjustment, it is not intended that such specific references be considered as limitations upon the scope of this invention except in-so-far as set forth in the following claims.

What is claimed is:

1. A display system, comprising:

a standardized display driver to provide address voltages;

an array of interferometric elements; and a voltage adjuster to adjust address voltages to provide adjusted row address voltages to the array of interferometric elements, wherein the voltage adjuster further comprises a resistor divider network configured to lower the address voltage amplitudes that are provided by the standardized display driver.

2. The display system of claim 1, the standardized display driver further comprising a driver for a liquid crystal display.

3. The display system of claim 1, the may of interferometric elements further comprising an array of iMoD™ elements.

4. The display system of claim 1, the voltage adjuster to adjust row address voltages.

5. The display system of claim 1, the voltage adjuster to adjust column address voltages.

6. A method of manufacturing an array of modulator elements and an adjuster circuit, comprising:

depositing a first metal layer on a transparent substrate;

patterning and etching the first metal layer to form electrodes;

depositing an optical stack layer;

depositing a first sacrificial layer upon the optical stack layer;

depositing a second metal layer on the sacrificial layer;

patterning and forming the second metal layer to form modulator elements;

forming a resistor divider network configured to lower address voltage amplitude that are provided from a standardized display driver; and forming resistors from one metal layer and connecting the resistors with a subsequent metal layer.

7. The method of claim 6, forming the resistors from one metal layer further comprising forming the resistors from the first metal layer and connecting the resistors with the second metal layer.

8. The method of claim 6, further comprising:

depositing a second sacrificial layer;

depositing a third metal layer on the second sacrificial layer; and patterning and etching the third metal layer to form posts and supports.

9. The method of manufacturing of claim 6, wherein the resistor divider network is formed on the first metal layer.

10. The method of claim 6 forming the resistors further comprising forming the resistors from the second metal layer and connecting the resistors using the third metal layer.

11. The method of claim 6, further comprising:

depositing a third sacrificial layer;

depositing a fourth metal layer on the third sacrificial layer;

patterning and etching the fourth metal layer to form a bus layer.

12. The method of claim 6, forming the resistors from one metal layer further comprising forming the resistors from the first metal layer and connecting the resistors using the fourth metal layer.

13. The method of claim 6, forming the resistors from one metal layer further comprising forming the resistors from the second metal layer and connecting the resistors using the fourth metal layer.

14. The method of claim 6, forming the resistors from one metal layer further comprising forming the resistors from the third metal layer and connecting the resistors using the fourth metal layer.

15. A resistor network, comprising:

an incoming address line;

a first resistor connected between the address line and a conductive bus; and a second resistor connected between the address line and an adjusted address line, wherein the resistor network lowers address voltage amplitudes provided by a standardized display driver.

16. The resistor network of claim 15 the address line further comprising a row address line.

17. The resistor network of claim 15, the address line further comprising a column address line.

18. The method of manufacturing of claim 6, wherein the resistor divider network is formed on the same substrate of the array.

19. The method of claim 6, forming the resistors further comprising forming the resistors from the first metal layer and connecting the resistors using the third metal layer.

20. The method of manufacturing of claim 6, wherein the resistor divider network is formed on the second metal layer.

* * * * *